United States Patent [19]

Belanger et al.

[11] Patent Number: 4,891,233

[45] Date of Patent: Jan. 2, 1990

[54] FLAKES OF BAKING SHORTENING OR LARD

[75] Inventors: Robert J. Belanger, Orleans; Robert A. Mignacca, Willowdale, both of Canada

[73] Assignee: The Procter & Gamble Company, Cincinnati, Ohio

[21] Appl. No.: 253,796

[22] Filed: Oct. 4, 1988

[30] Foreign Application Priority Data

Oct. 6, 1987 [CA] Canada ................................. 548707

[51] Int. Cl.$^4$ .............................................. A21D 13/00
[52] U.S. Cl. ...................................... 426/94; 426/289; 426/302; 426/502; 426/555; 426/556
[58] Field of Search ................ 426/94, 250, 555, 556, 426/502, 302, 289, 291

[56] References Cited

U.S. PATENT DOCUMENTS

| | | | |
|---|---|---|---|
| 2,607,697 | 8/1952 | Brown | 426/250 |
| 3,879,563 | 4/1975 | Tucker et al. | 426/128 |
| 4,374,151 | 2/1983 | Lindstrom et al. | 426/19 |
| 4,395,426 | 7/1983 | Fan | 426/62 |
| 4,645,673 | 2/1987 | Wilmes | 426/94 |
| 4,761,290 | 8/1988 | Meraj et al. | 426/291 |

Primary Examiner—Donald E. Czaja
Assistant Examiner—D. Workman
Attorney, Agent, or Firm—Monte D. Witte; Thomas H. O'Flaherty; Richard C. Witte

[57] ABSTRACT

A solidified fat in the form of flakes for use in making piecrust dough has a solids content index profile within the range defined in FIG. 3. The fat comprises triglycerides of saturated and unsaturated monocarboxylic acids having from 10 to 20 carbon atoms. Such flakes of fat may be used in making a pastry composition comprising pastry making flour, premeasured amount of the flakes and a sufficient amount of a liquid fat for coating at least portions of the flakes to promote adherence of flour to the flakes in making a pastry dough.

9 Claims, 2 Drawing Sheets

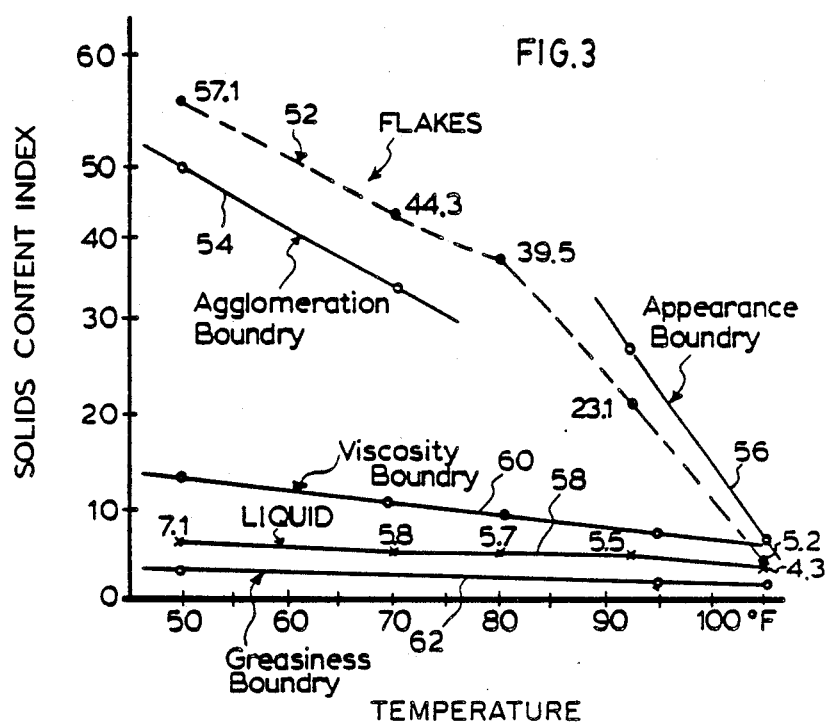

FLAKES OF BAKING SHORTENING OR LARD

FIELD OF THE INVENTION

This invention relates to pastry making compositions and in particular, flakes of fat having a particular solids content index profile in combination with a liquid fat enables the making of a flaky pastry crust.

BACKGROUND OF THE INVENTION

It is generally accepted that the art of making pastry crust is a technique passed on from generation to generation and cannot be readily learned from cookbooks and the like. Many people consider the art of pastry making to involve some form of "magic" and hence do not even attempt to make pies and pastries.

Many attempts have been made in the areas of premixed piecrust dough and frozen piecrust dough in the shape of the pie shell. It is generally accepted that frozen piecrusts cannot compete with the quality of fresh piecrusts. In the field of premixed doughs, U.S. Pat. No. 4,645,673 discloses frozen pizza dough which is of a bread dough composition distinct from pastry dough compositions. The dough is made up of a specific mixture of high protein and low protein wheat flours and contains between 10% to 17% by weight of solid fat pieces preferably in the form of flakes. The flakes of fat have a melting point in the range of 118° to 130° F., in accordance with the Wiley melting method. The solid fat pieces remain in the dough until the dough goes into the oven for baking. Pizza toppings are applied to the dough when laid out in the form of a pizza shell and the food product is then frozen. It has been found in this patent that, by the use of solid fat pieces in the form of flakes, the resultant pizza dough, when baked, had very flaky, tender and open crust. There are, however, several technical distinctions between processes for making pizza bread-like dough and piecrust dough.

SUMMARY OF THE INVENTION

According to another aspect of the invention, a pastry-making composition comprises, in combination, a premeasured amount of pastry-making flour, a premeasured amount of flakes of fat having a solids content index range as defined in FIG. 3 and a sufficient amount of a liquid fat for coating at least portions of the flakes to promote adherence of the composition and facilitate the making of a pastry dough.

According to another aspect of the invention, a process for making a pastry dough comprises mixing a premeasured amount of pastry-making flour, a premeasured amount of salt and a premeasured amount of a solidified fat in the form of flakes having a solids content index profile within the range defined in FIG. 3. A liquid fat is added to the dry mixture in an amount sufficient to promote adherence of the dry mixture to the flakes. The mixed composition is then moistened with water to form a pastry dough.

According to a preferred aspect of the invention, the liquid fat is colored to facilitate substantial mixing thereof throughout the composition.

BRIEF DESCRIPTION OF THE DRAWINGS

Preferred embodiments of the invention are shown in the drawings wherein:

FIG. 3 is a solids content index profile for the flakes of fat and liquid fat in making pastry dough.

DETAILED DESCRIPTION OF THE PREFERRED EMBODIMENTS

It is generally appreciated by experienced piecrust-dough makers that over mixing of a source of fat in the baking composition produces a "tough" crust. On the other hand, insufficient mixing of the fat source through the baking composition results in a dough which is crumbly and cannot be readily worked in the shape of a piecrust or other pastry product. Hence in mixing the source of fat into the baking composition, it is important to achieve just the right balance. In accordance with this invention, a source of fat is provided which permits both experienced and inexperienced pie bakers to make a quality piecrust on a reliable "failure-free" basis. The use of a flaked form of fat, in accordance with this invention, allows optimum mixing and homogeneous distribution of the small pieces of fat flakes throughout the flour. When baked, the fat pieces form numerous pockets in the pastry giving it a tender and flaky texture. Flaky pastries require a high solids content in the fat source and these flakes of fat contribute to such a high solids content. The high levels of solids in the fat leads to a random distribution of fat "pockets" in the flour upon mixing the fat and flour. Without a high solids content, a homogeneous mixing would occur and no concentrated pockets of fat would be produced. The flakes of fat, when baked, melt and create a cavity in the dough. When the temperature reaches approximately 100° C. in the crust, steam is generated filling the cavities to the point of expansion thus creating a "flake" in the dough. Hence the flakes of fat provide the user with a preparation which consistently leads to improved pastry products. This approach to pastry composition avoids unsatisfactory pastry results due to improper mixing of the fat and flour components. It has been discovered that the use of flakes of fat requires merely tossing the fat and flour together for optimum mixing results.

Figure 1:
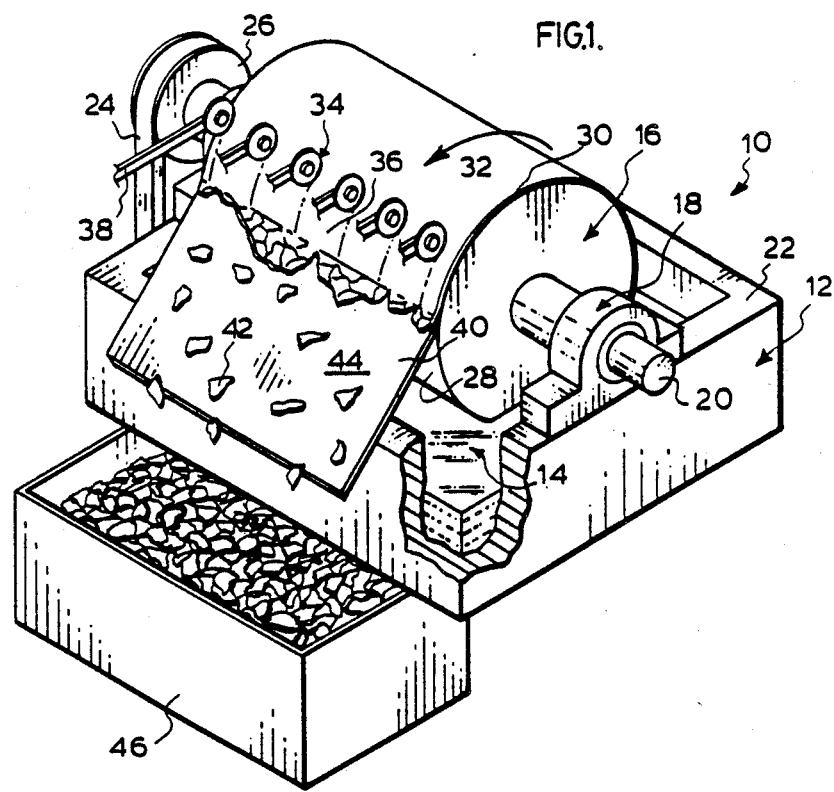
FIG. 1 is a perspective view of an apparatus for forming flakes of fat.

The development of a suitable fat composition having appropriate solids content index in a lower temperature range and in a higher temperature range required the blending of fats having varying degrees of hydrogenation. It is well understood that the degree of hydrogenation of the triglycerides of the fat source determines the hardness of the fat stock. The solids content index is a manufacturing standard used to measure the extent of hydrogenation in the fat components used in making the final composition. Over a limited range, the solid content index (SCI) value is numerically, approximately equal to the actual percent solids in the sample. At high temperatures, the fat product will be completely melted. At low temperatures, the fat can be completely solid. In between these low and high temperature ranges, there are varying degrees of solid fat content in the fat composition. A prescribed method is provided for the measuring of SCI values. This is defined by in "Official Methods and Recommended Practices of the American Oil Chemist's Society" - Method Identification CD 10-57 - Solid Fat Index, Published by AOCS, 41 East University Avenue, Champaign, Ill. Hence by judicious selection of varying degrees of hydrogenated triglycerides, a variety of SCI profiles for various fat compositions can be developed. With respect to the manufacture of flakes of fat suitable for use in accordance with this invention to make pastry dough, there are special requirements for a lower value for the SCI in the lower temperature range, which is referred to as the agglomeration boundary, and an upper value in the upper temperature range which is referred to as the appearance boundary. Further details of these boundaries are discussed with respect to FIG. 3. Once a suitable fat composition has been prepared, which provides an SCI value in the range disclosed in FIG. 3, the fat composition can then be prepared in flake form. With reference to FIG. 1, a suitable apparatus for making flakes of fat having the appropriate SCI values is shown in FIG. 1. The apparatus 10 comprises a container 12 which is heated sufficiently to provide a melted bath of fat 14. The composition of the melted fat 14 is such to fall within the SCI boundaries of FIG. 3. Suitable means may be provided in the wall 12 of the container. Such devices may include electrical resistant elements incorporated in the wall. A temperature sensor or the like may be positioned in the bath to monitor the temperature thereof and ensure that it is at a level that the fat is always in liquid form. A chilled roller 16 is mounted on bearings 18 by way of shaft 20. The bearings 18 are mounted on the upper surface 22 of the walls of the container. The shaft 20 is driven by a drive belt 24 passing over pulley 26 which is keyed to the shaft 20 in the normal manner. The roller 16 may be chilled by any suitable means, such as coolant which may be fed to the roller 16 by suitable conduits. The conduits may communicate through the centre of the shaft 20 in accordance with standard techniques. The temperature of the surface 28 of the roller is such that on contact with the liquid fat in the bath 14 a layer of fat is solidified and congeals and adheres to the surface 28. The layer of solidified fat is indicated at 30. Hence as the roller rotates in the direction of arrow 32, as driven by the belt 24, the continuous layer 30 of solidified fat approaches a series of cutters 34 for cutting the layer of fat into individual strips 36. Suitable supports are provided for the cutting rollers 34. The supports 38 extend away from the chilled rollers 16 and are supported on a suitable carriage which is not shown.

In order to break the layer of solidified fat into suitably sized flakes, a doctor blade 40 is in contact with the surface 28 of the roller. The blade scrapes the solidified fat strips 36 from the roller. In so doing, the strips are broken up into individual flakes 42. The flakes fall from the surface 44 of the doctor blade into a collector bin 46. Hence, in accordance with this technique, the suitable fat flakes are prepared. It is appreciated that such technology in preparing flakes of fat and other solidified layers of components has been conducted in the past, such as in the manufacture of flake soap products.

Figure 2:
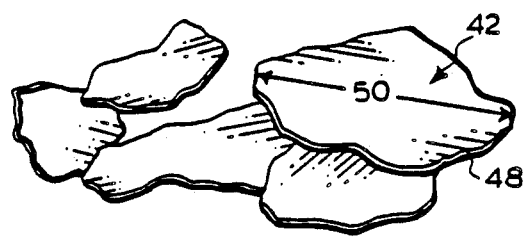
FIG. 2 is a perspective view of representative shapes for the flakes of fat.

In accordance with a preferred embodiment of the invention, the chilled roller 16 may be maintained at a temperature in the range of 35° to 40° F. The fat stock is at its melting temperature which is normally above 100° F. The chilled roller is rotated at a speed of approximately 6 to 10 rpm, where it is understood that the speed of rotation can be adjusted based on the solidification rate of the fat stock. As shown in FIG. 2, the produced flakes 42 are of irregular shape. Generally, the thickness of the flakes, as defined by, for example, edge portion 48, is in the range of 0.02 to 0.25 cm. Due to the irregular shape of the flakes, it is difficult to provide a length and width dimension. Hence the dimension of the flake is defined as the longest length, such as length 50 of FIG. 2. This length dimension may be in the range of 0.25 cm to 2.5 cm. The preferred thickness range of the flake size is approximately 0.02 cm to 0.06 cm, where it is understood that the thickness is determined by the temperature of the chilled roller, the temperature of the bath of fat and the speed at which the roller is rotated.

It is appreciated that there are a variety of sources for the fats used in making the desired flake characteristics. The term "fat" as used generically herein refers to edible fats and oils comprising triglycerides, fatty acids, fatty alcohols, and esters of such acids and alcohols. For the purposes of this invention, appropriate components are triglycerides of straight chain or branch chain, saturated or unsaturated monocarboxylic acids having from 10 to 28 carbon atoms. Suitable sources of such fats are:

(1) vegetable fats and oils, such as soya bean, olive, corn, safflower, sunflower, cotton seed, canola, rape seed, sesame seed, nasturtium seed, tiger seed, rice branch, wall flower and mustard seed;
(2) meat fats, such as tallow or lard;
(3) marine oils, such as menhaden, pilchard, sardine, whale or herring;
(4) nut fats and oils, such as coconut, palm, palm kernel, babas kernel or peanut;
(5) milk fats, such as butter fat;
(6) coca butter and coca butter substitutes, such as shea, or illipe butter; and
(7) synthetic fats.

Of the available selection, preferred components are edible polymorphic vegetable fats and mixtures thereof comprising triglycerides having saturated or unsaturated acyls groups predominantly in the range of from 12 to 44 carbon atoms, such as lauroyl, lauroleoyl, myristroyl, myristoleoyl, palmitoyl, palmitoleoyl, stearoyl, oleoyl, linoleoyl, arachidoyl, arachidonoyl, behenoyl, erucoyl and the like. Branched chain saturated or unsaturated acyl groups are also useful for this invention.

It is appreciated that additives may be included in the fat composition. Such optional components include a stabilizer to protect against oxidative deterioration at high temperatures, such as increases in viscosity and fatty acid content formation of polymerized fatty matter, increase in refractive index, destruction of tocopherol, and intensification of foaming tendencies due to the formation of oxidized and polymerized constituents. Silicone oils, particularly methyl and ethyl silicones, are useful for this purpose.

Various other additives can be used in the fats of this invention provided that there are edible and aesthetically desirable and do not have a detrimental effect on the desired SCI value of the resultant composition. The composition may also contain minor amounts of optional flavoring, emulsifiers and the like.

To provide a fat containing the proper balance of SCI values as generally defined in the range of FIG. 3, one must either hydrogenate or blend fats of different iodine values. Hydrogenation can be carried out by conventional methods and usually consist of a batch process whereby the fat composition is contacted with hydrogen in the presence of a nickel catalyst. The SCI value of a fat can also be increased by adding to it a small amount of fat with a low iodine value. As is generally understood, the iodine value of a fat indicates the number of grams of iodine equivalent to the halogen absorbed by a 100 gram sample. The lower the iodine value of a given fat, the greater will be its solids content at a given temperature and the more saturated it will be.

By the suitable blending of selected fats, a composition can be provided which fits within the ranges defined in FIG. 3. In accordance with standard practice, the prepared fats can be deodorized.

In accordance with this invention, a novel solids content index value range is provided to prepare flakes of fat which are particularly suited to the making of piecrust dough and ensure a consistent quality of piecrust. FIG. 3 shows the preferred SCI index value for the fat composition over a temperature range of approximately 50° F. through 105° F. The preferred composition is shown in dotted line 52 and identified by the term "flakes". It is appreciated, however, that deviation from the dotted line 52 may be accommodated in providing a range of SCI values for suitable fat compositions. However, a lower boundary is determined by line 54 which is identified as the agglomeration boundary. This boundary becomes significant in the lower temperature range such as 50° to 70°. Similarly, in the higher temperature range, for example of 85° to 105° F., there is an upper boundary defined by line 56 and itemized as the "appearance" boundary. As indicated by the description of these two boundaries, there are criteria to be considered in providing just the right SCI value over the entire temperature range to produce a quality piecrust.

The agglomeration boundary 54 is determined by an SCI value range which first avoids the flakes of fat agglomerating together during storage and loosing their identify and second, provides flakes which are sufficiently malleable such that when incorporated into the baking ingredients at room temperature, they may be easily worked into the dough making composition. At the other end of the scale, the appearance boundary 56 is defined by the necessity that the flakes of fat do not have too high of an SCI value at the upper temperatures, so that, when baked, the flakes of fat melt completely at the right time in the baking process to produce the desired pockets and flakiness, and thus avoid a "cratering" effect. The cratering effect is due to the fat not melting soon enough and due to gravity. The unmelted lumps of fat fall through the pastry dough forming holes in the pastry. In defining the agglomeration boundary at the lower temperature end and the appearance boundary at the higher temperature end, it is an understood characteristic of fat compositions that any fat which has an SCI value in the range of 50 to 70 is above the agglomeration boundary, but cannot go too high or else the SCI values are above the appearance boundary 56. Similarly, a fat composition having a value below the appearance boundary range, would be below the agglomeration boundary 54. Hence, the agglomeration boundary 54 and the appearance boundary 56 define the acceptable range of SCI values for the fat composition which is particularly suitable to use in the making of pastry dough. By experimentation, it has been determined that any flake composition having an SCI value below the agglomeration boundary results in flakes which have a tendency to congeal and in some instances loose their identity and form lumps of fat which cannot be broken up and hence cannot be used in the making of pastry dough. Similarly, it has been discovered that SCI values for flake compositions which are above the appearance boundary result in flakes of fat which produce the cratering effect. However, any flake composition having SCI values within these boundaries over the entire range of 50° F. to 150° F. produces a very acceptable, consistent, baked pastry quality.

Additional criterium which was considered in defining the agglomeration boundary, is the storage capability of the flakes. The flakes must be capable of being stored at temperatures in the range of 80° to 100° F. without agglomerating to an unacceptable extent. Unacceptable agglomeration occurs in situations where the flakes have congealed together and cannot be broken up into free flowing chips. From FIG. 3 it is apparent that a solids content index at 50° F. is a minimum of approximately 50% and the solids content index at 105° F. is a maximum of approximately 10%.

In the process of making a pastry dough, the pastry making composition comprises in combination pastry-making flour, flakes having SCI values in the range of FIG. 3 which are mixed to distribute the flakes throughout the flour. It has been discovered, however, that the liquid fat is preferably incorporated in the dry mix to coat at least portions of the flakes to promote adherence of the composition in making the pastry dough. Without the liquid fat, the dry composition does not take on a suitable consistency to make a proper pastry dough. As with the fat composition of the flakes, the fat composition of the liquid fat also has prescribed boundaries of SCI values over the temperature range of 50° to 105° F. With reference to FIG. 3, the preferred SCI values for the liquid fat are identified by the solid line 58. The range, however, for the SCI values for the liquid fat are defined by a viscosity boundary 60 at the upper level and a greasiness boundary 62 at the lower level. If the liquid fat has an SCI value above the viscosity boundary, too much solids are present. The liquid fat becomes too thick and does not pour readily. The fat can become globby which will not facilitate even distribution throughout the dry mix. The lower boundary 62 is determined by the fact that if the solids get too low, a greasiness appearan,ce and taste is imparted to the pastry crust. Hence to avoid the greasy texture, the SCI values are above the boundary line 62. It is appreciated, as with the flake composition, a judicious selection of various degrees of hydrogenation of fat sources can provide liquid fats having SCI values in the range noted in FIG. 3 between the upper boundary 60 and the lower boundary 62. By adding the liquid fat to the dry mix, the liquid fat not only coats the flakes and promotes adherence of flour to the flakes, but also promotes adherence of the flour particles to one another. Variations in the amount of oil used depends on a number of considerations including the type of flour employed in the pastry composition. Various, readily available, pastry-making flours can be selected from the group consisting of all purpose flour, hard wheat flour, soft wheat flour, pastry flour and mixtures thereof. In order to assist the baker in mixing the liquid fat throughout the composition, it is preferable to provide a color to the fact such as a deep yellow. The baker can then determine by the color of the mixture when the liquid fat is substantially mixed throughout the compositin. This avoids over mixing which could result in the break-up of the flakes of fat if over worked for some time.

In accordance with the method of this invention, once the flakes of fat have been incorporated into the dry mixture and sufficient amount of liquid fat added to promote adherence to the dry mixture, the composition is then moistened with water to form a pastry dough. The amount of water being used is minimal, yet modifies the starch structure to produce the composition. To enhance the binding characteristics of the flour with water added, various other dough strengthening agents may be included, such a starches, lithecin, albumins and baking gums which are common in the baking industry. Where needed, such additives can enhance the consistency in producing quality piecrust. However, the preferred aspect in the mixing continues to be the use of a liquid fat which helps in the smearing of the flour and flakes in mixing the dry dough composition.

In accordance with this invention, it is appreciated that the flakes of fat, as adapted for use, in making a pastry dough can be used in a number of ways. The flakes of fat, liquid fat, flour and salt may be combined in a variety of ways to customize the mixing of components to particular uses and marketing. For example, the flakes of fat may be sold as an individual commodity with instructions on how to use flakes in making a pastry composition. A suitable liquid fat can either be sold in conjunction with the flakes of fat where the liquid fat has the SCI values of FIG. 3, or in some instances the liquid fat may already be available. The system may also be sold as a premix, where the flakes of fat are in a sealed pouch separate from a sealed pouch of liquid oil. The necessary flour for making the pastry can also be provided in the kit as a sealed separate pouch. The user can then readily add the necessary salt, water and other desired additives to make the pastry composition. On the other hand, a dough could be shaped into piecrust shells and sold as a preshaped frozen dough, or the dough could be sold as a frozen product to be later thawed, shaped by the user into the desired shell and baked. Baking of the piecrust may be accomplished in accordance with standard techniques, such as by use of convection or microwave ovens. A variety of techniques are generally employed to evaluate quality of baked pastry composition. Key criteria in evaluation quality is overall preference, flakiness and taste. Typically the test panelists would rate the piecrust quality in each of these areas by stating factors, such as excellent, very good, good, fair and poor. In the overall preference rating the considerations were based on tenderness, greasiness, appearance and crispiness.

Another aspect considered in determining the acceptability of the product is in the preparation of the pastry dough. Specific considerations included ease of preparation, ease of mixing, crumbliness, stickiness, ease of making the dough ball and rolling out of the dough ball in making the desired pastry crust shape.

In establishing the boundaries for the flake composition, and the liquid composition of FIG. 3, various compositions for each component were made up in the form of baked pastry crusts and tested. The above criteria were set as guides for the testing panel and any composition which resulted in rating of less than fair was rejected. To provide uniformity in the results, all compositions were prepared by the same expert baker.

As is appreciated, the relatively standard approach is generally accepted in making piecrust dough, rolling it out into a desired shape and baking of pies. The following example provides an exemplary pastry recipe.

EXAMPLE 1

| | Ingredients | | % Composition |
|---|---|---|---|
| 500 ml | All purpose flour | 2 cups | 53.7 |
| 4 ml | Salt | ¾ tsp | 0.6 |
| 57 g | Flakes | 57 g | 10.4 |

-continued

| | Ingredients | | % Composition |
|---|---|---|---|
| 133 g | Liquid shortening | 133 g | 24.3 |
| 60 ml | Water | 4 tbsp. | 11.0 |

Dough Making Steps

The flour, salt and flakes are mixed in a bowl. The liquid shortening is then added to the dry mixture at approximately one-third at a time. The ingredients are mixed well with a fork until the right yellow color of the liquid shortening appears to be generally distributed throughout the dry mix. The composition is then sprinkles with cold water at approximately one teaspoon at a time, while mixing the composition with a fork. The composition is then formed into a firm dough ball. The dough may be used in a making piecrust, in which case the dough ball was halved and each half was rolled out on a well floured surface.

One section of rolled out dough was placed over a pie plate and properly edge trimmed. A suitable pie filling was added to the pastry lined plate. The filling was then covered with a top crust. The top edge of the top layer of dough was folded under the bottom layer of dough and sealed. The top layer of dough was pricked to provide small holes for escape of moisture. The prepared pie was baked at 450° F. for 40 to 50 minutes, as required by the filling recipe.

Several pies were made in accordance with this recipe to provide for tasting by a panel.

The results of the panel test are as follows based on a comparison of the subject piecrusts to commercially available fats for making piecrusts.

TABLE 1

| | % of Panelists Flakes of Fat | % of Panelists Crisco* | % of Panelists Tenderflake* |
|---|---|---|---|
| Overall Preference | 60 | 40 | |
| | 70 | | 30 |
| Preference for flakiness | 77 | 23 | |
| | 62 | | 38 |
| Preference for taste | 58 | 42 | |
| | 67 | | 33 |

*Crisco (trademark) shortening sold by Procter & Gamble
Tenderflake (trademark) lard sold by Canada Packers Based on these test results, the flakes of fat shortening system according to this invention provides a reliable superior method of making piecrusts compared to known pastry compositions based on Crisco and Tenderflake. The pastry making step is considerably simplified, where the critical step in mixing the fat and flour is accommodated by the flakes of fat system. The flakes allow optimum mixing and homogeneous distribution of small pieces of shortening throughout the flour.

Although preferred embodiments of the invention have been described herein in detail, it will be understood by those skilled in the art that variations may be made thereto without departing from the spirit of the invention or the scope of the appended claims.

We claim:

1. A pastry making composition comprising, in combination, a premeasured amount of pastry-making flour, a premeasured amount of flakes of fat, said flakes of fat having a minimum solids content index of about 50% at about 50° F., and a maximum solids content index of about 10% at about 105° F., and a sufficient amount of a liquid fat generally distributed throughout the composition for coating at least portions of said flakes to promote adherence of said composition to facilitate making a pastry dough.

2. A composition of claim 1, wherein said liquid fat has a solids content index of about 7.1% at about 50° F., and of about 4.3% at about 105° F.

3. A composition of claim 1, wherein a weight ratio of said premeasured amount of flakes of fat to said premeasured amount of flour is within the range of approximately 1:5.

4. A composition of claim 1, wherein said pastry-making type flour is selected from the group consisting of all-purpose flour, hard wheat flour, soft wheat flour, pastry flour and mixtures thereof.

5. A process for making a pastry dough comprising mixing a premeasured amount of pastry-making type flour, a premeasured amount of salt and a premeasured amount of a solidified fat in the form of flakes, said flakes of fat having a minimum solids content index of about 50% at about 50° F., and a maximum solids content index of about 10% at about 105° F., adding to such dry mixture and mixing in a sufficient amount of a liquid fat until generally distributed throughout the dry mixture for promoting adherence of said dry mixture, to facilitate making a pastry dough.

6. A process of claim 5, wherein said liquid fat is colored so as to be visible in said mixture, mixing said liquid fat into said dry mixture until such colored liquid fat is substantially mixed throughout such mixed composition.

7. A process of claim 5, wherein said flakes of fat have a thickness in the range of 0.02 to 0.25 cm and have a length dimension in the range 0.25 to 2.5 cm.

8. A process of claim 5, further comprising freezing said pastry dough.

9. A frozen pastry dough composition when made by the process of claim 8.

* * * * *